United States Patent
Park et al.

(10) Patent No.: US 12,107,259 B2
(45) Date of Patent: Oct. 1, 2024

(54) NEGATIVE ELECTRODE COMPRISING A PROTECTIVE LAYER FOR A LITHIUM SECONDARY BATTERY, METHOD FOR MANUFACTURING SAME, AND LITHIUM SECONDARY BATTERY INCLUDING SAME

(71) Applicants: LG CHEM, LTD., Seoul (KR); IUCF-HYU (INDUSTRY-UNIVERSITY COOPERATION FOUNDATION HANYANG UNIVERSITY), Seoul (KR)

(72) Inventors: Eunkyung Park, Daejeon (KR); Minchul Jang, Daejeon (KR); Taeseup Song, Seoul (KR); Seho Sun, Seoul (KR); Dongsoo Lee, Daejeon (KR); Byoungkuk Son, Daejeon (KR)

(73) Assignees: LG ENERGY SOLUTION, LTD., Seoul (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 929 days.

(21) Appl. No.: 17/257,615

(22) PCT Filed: Mar. 5, 2020

(86) PCT No.: PCT/KR2020/003125
§ 371 (c)(1),
(2) Date: Jan. 4, 2021

(87) PCT Pub. No.: WO2020/184900
PCT Pub. Date: Sep. 17, 2020

(65) Prior Publication Data
US 2021/0273217 A1    Sep. 2, 2021

(30) Foreign Application Priority Data
Mar. 8, 2019 (KR) .................. 10-2019-0026807
Mar. 4, 2020 (KR) .................. 10-2020-0027055

(51) Int. Cl.
*H01M 4/1395* (2010.01)
*C23C 8/02* (2006.01)
(Continued)

(52) U.S. Cl.
CPC ............. *H01M 4/1395* (2013.01); *C23C 8/02* (2013.01); *C23C 8/48* (2013.01); *C23F 1/32* (2013.01);
(Continued)

(58) Field of Classification Search
CPC .. H01M 4/366; H01M 4/1395; H01M 4/0402; H01M 4/134; H01M 2004/021;
(Continued)

(56) References Cited

U.S. PATENT DOCUMENTS

2009/0280410 A1   11/2009   Zaguib et al.
2012/0003532 A1    1/2012   Badding et al.
(Continued)

FOREIGN PATENT DOCUMENTS

CN   101489776 A   7/2009
CN   104882832 A   9/2015
(Continued)

OTHER PUBLICATIONS

Zhao, M., Huang, X., Zhuang, D., Sheng, L., Xie, X., Cao, M., Pan, J., Fan, H., & He, J. (2021). Constructing porous nanosphere structure current collector by nitriding for lithium metal batteries. Journal of Energy Storage, 47. https://doi.org/10.1016/j.est.2021.103665 (Year: 2021).*

(Continued)

*Primary Examiner* — Christopher P Domone
*Assistant Examiner* — Kimberly Wyluda
(74) *Attorney, Agent, or Firm* — Birch, Stewart, Kolasch & Birch, LLP

(57) ABSTRACT

A negative electrode for a lithium secondary battery including a lithium metal layer and a protective layer including a three-dimensional structural body made of metal and lithium nitride on the lithium metal layer. The protective layer induces uniform ionic conductivity and electrical conductivity on the surface of the negative electrode. A method for manufacturing method a negative electrode for a lithium secondary battery including the steps of forming a metal
(Continued)

hydroxide having a three-dimensional structure, forming a metal nitride having a three-dimensional structure by a nitridation reaction of the metal hydroxide of the three-dimensional structure; and transferring the metal nitride having the three-dimensional structure onto a lithium metal layer to form a protective layer. A lithium secondary battery including the negative electrode for a lithium secondary battery.

12 Claims, 5 Drawing Sheets

(51) Int. Cl.
  *C23C 8/48*   (2006.01)
  *C23F 1/32*   (2006.01)
  *H01M 4/02*   (2006.01)
  *H01M 4/04*   (2006.01)
  *H01M 4/134*   (2010.01)
  *H01M 4/36*   (2006.01)
  *H01M 10/0525*   (2010.01)

(52) U.S. Cl.
  CPC ......... *H01M 4/0402* (2013.01); *H01M 4/134* (2013.01); *H01M 4/366* (2013.01); *H01M 10/0525* (2013.01); *H01M 2004/021* (2013.01); *H01M 2004/027* (2013.01)

(58) Field of Classification Search
  CPC ........ H01M 2004/027; H01M 10/0525; C23C 8/02; C23C 8/48; C23F 1/32
  See application file for complete search history.

(56) References Cited

U.S. PATENT DOCUMENTS

| | | |
|---|---|---|
| 2017/0062829 A1 | 3/2017 | Ryu et al. |
| 2017/0317352 A1 | 11/2017 | Lee et al. |
| 2018/0034060 A1 | 2/2018 | Kong et al. |
| 2020/0075942 A1 | 3/2020 | Choi et al. |
| 2020/0127293 A1 | 4/2020 | Son et al. |
| 2021/0083291 A1 | 3/2021 | Lee et al. |

FOREIGN PATENT DOCUMENTS

| | | | |
|---|---|---|---|
| CN | 108159200 A | 11/2016 | |
| CN | 106486699 A | 3/2017 | |
| CN | 107394115 A | 11/2017 | |
| CN | 107863488 A | 3/2018 | |
| CN | 114695951 A * | 7/2022 | ........ H01M 10/0562 |
| EP | 3136475 A1 | 3/2017 | |
| JP | 2013-530507 A | 7/2013 | |
| JP | 2017-199678 A | 11/2017 | |
| KR | 10-2009-0040442 A | 4/2009 | |
| KR | 10-2017-0026098 A | 3/2017 | |
| KR | 10-2017-0124075 A | 11/2017 | |
| KR | 10-2018-0012541 A | 2/2018 | |
| KR | 10-2018-0032000 A | 3/2018 | |
| KR | 10-2018-0032168 A | 3/2018 | |
| KR | 10-2018-0105345 A | 9/2018 | |

OTHER PUBLICATIONS

EPO machine generated English translation of CN-114695951-A (Year: 2022).*
Bai et al., "Surface modification via a nanosized nitride material to stabilize lithium metal anode," Ceramics International, vol. 45, 2019, pp. 8045-8048.
Extended European Search Report for European Application No. 20769062.9, dated Sep. 27, 2021.
International Search Report issued in PCT/KR2020/003125 (PCT/210), dated Jun. 12, 2020.
Lee et al., "Copper Nitride Nanowires Printed Li with Stable Cycling for Li Metal Batteries in Carbonate Electrolytes", Advanced Materials, vol. 32, 2020, pp. 1905573 1-1905573 9.
Liu et al., "An Artificial Solid Electrolyte Interphase with High Li-Ion Conductivity, Mechanical Strength, and Flexibility for Stable Lithium Metal Anodes", Advanced Materials, 2017, pp. 1605531 1-1605531 8.
Meng et al., "Integrated Cu3N porous nanowire array electrode for high-performance supercapacitors", Journal of Materials Chemistry A, 5(36), 2017, pp. 18972-18976.
Zhou et al., "Ultrathin CoFe-layered double hydroxide nanosheets embedded in high conductance Cu3N nanowire arrays with a 3D core-shell architecture for ultrahigh capacitance supercapacitors", Journal of Materials Chemistry A, vol. 6, 2018, pp. 24603-24603.

* cited by examiner

[Figure 1]
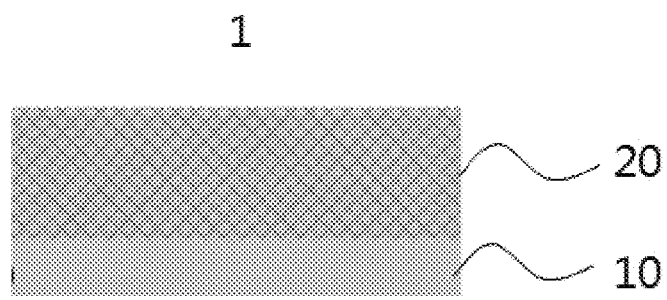
[Figure 2]
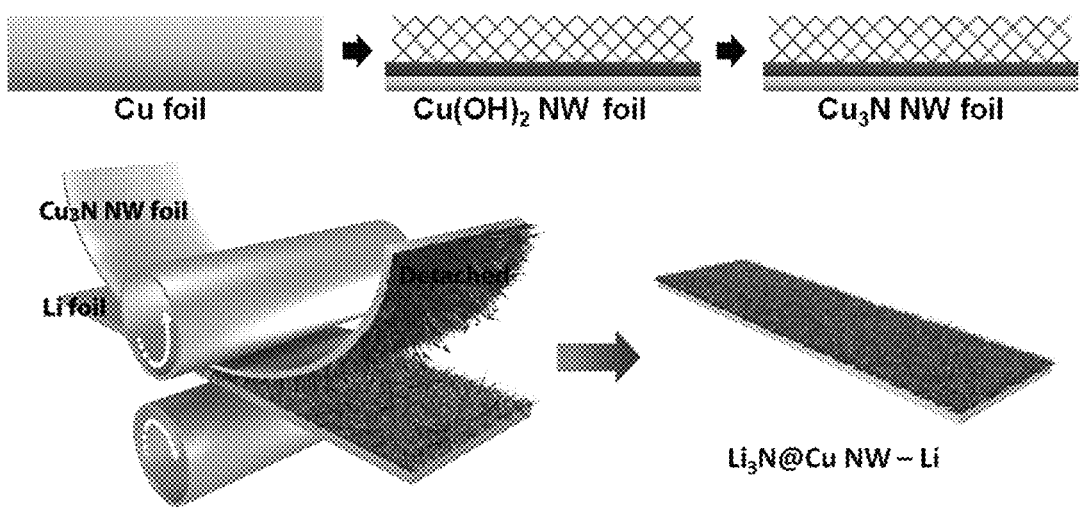

[Figure 3]
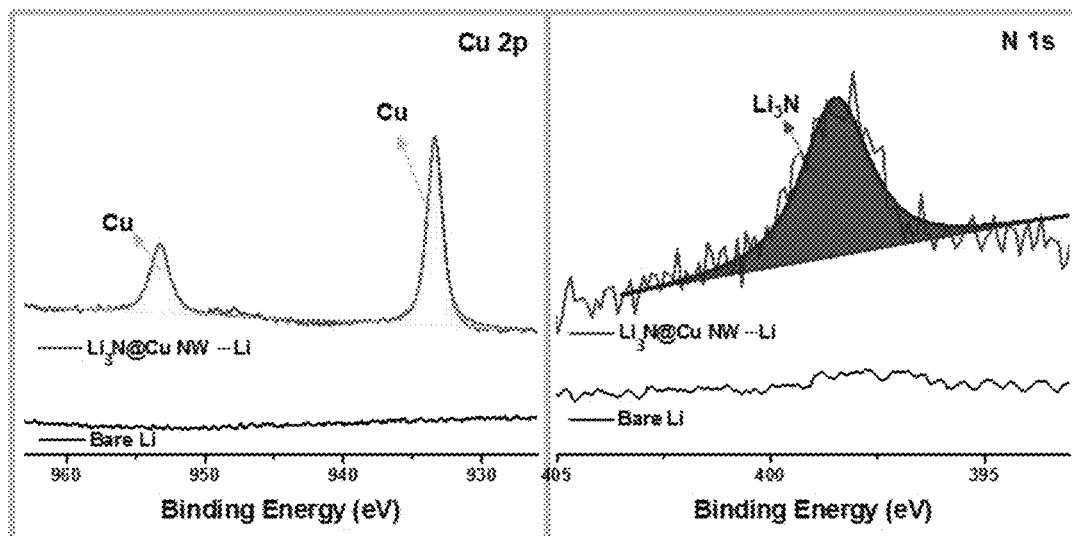
[Figure 4]
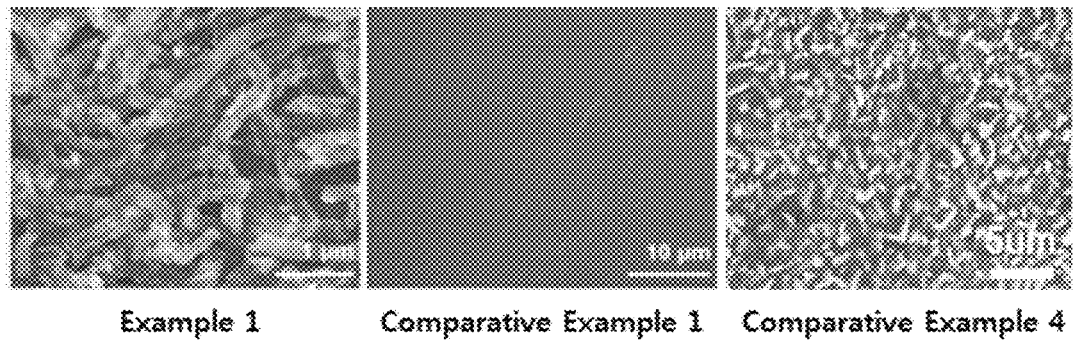
[Figure 5a]
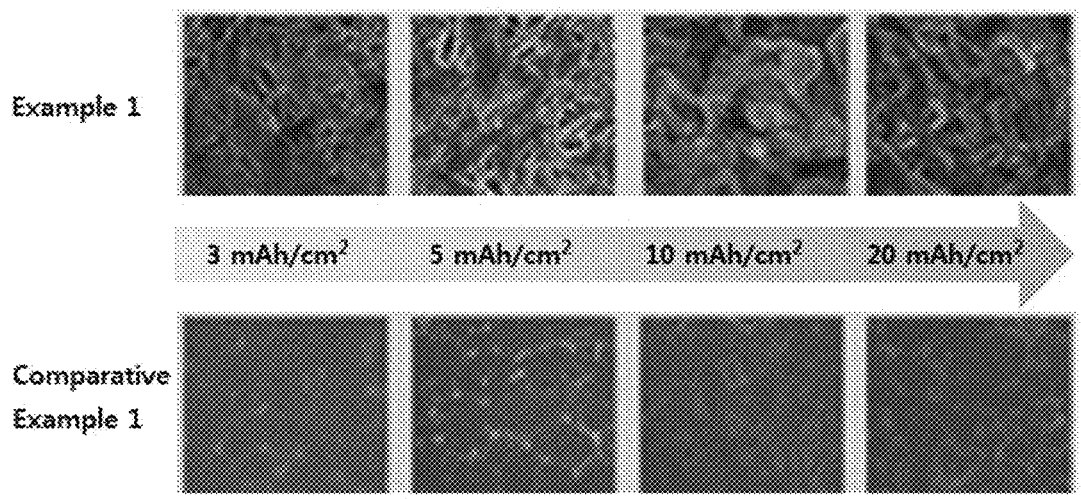

[Figure 5b]
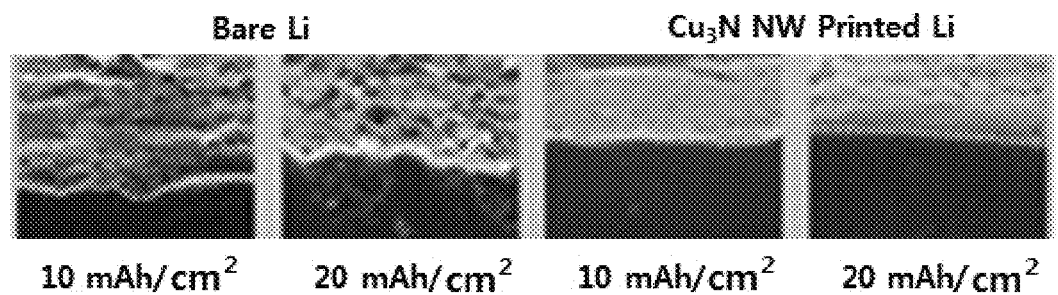

[Figure 6a]
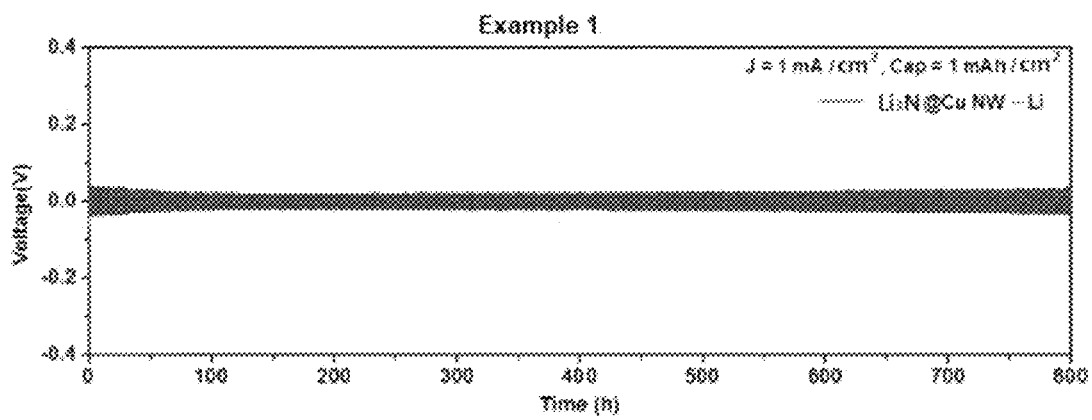
[Figure 6b]
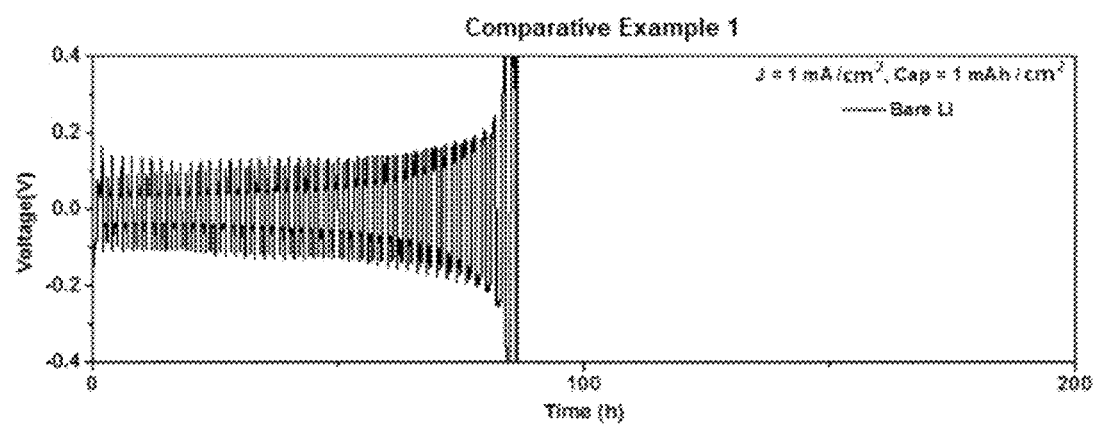
[Figure 6c]
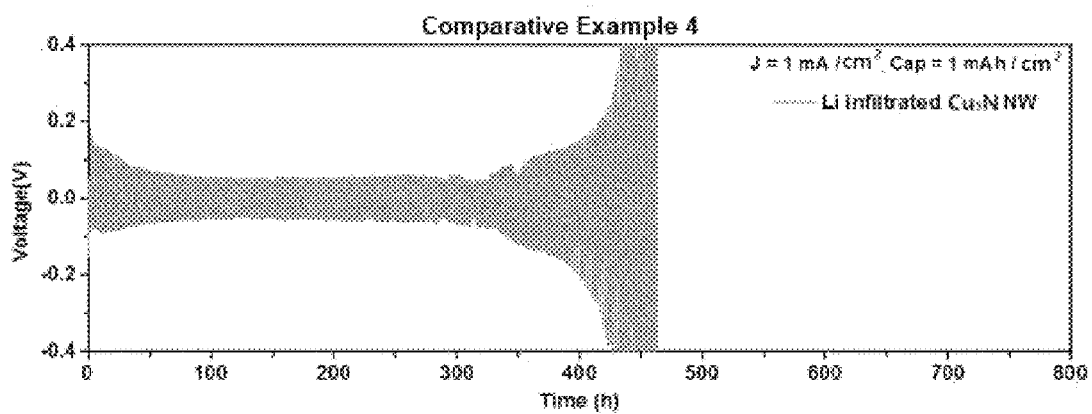

[Figure 7a]
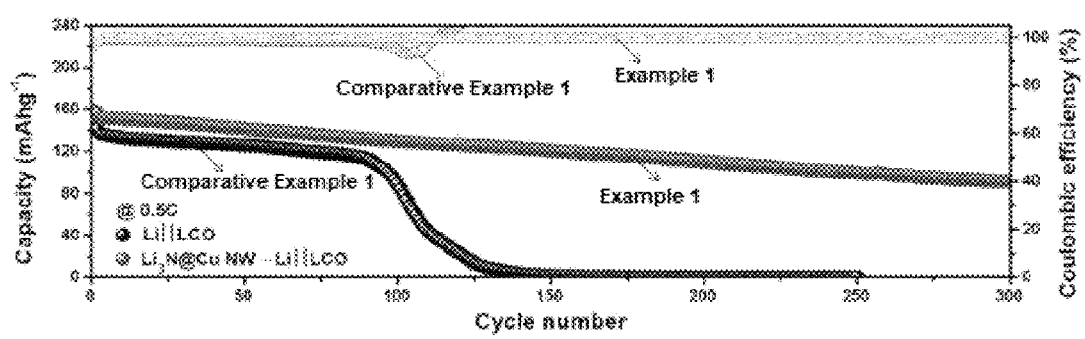
[Figure 7b]
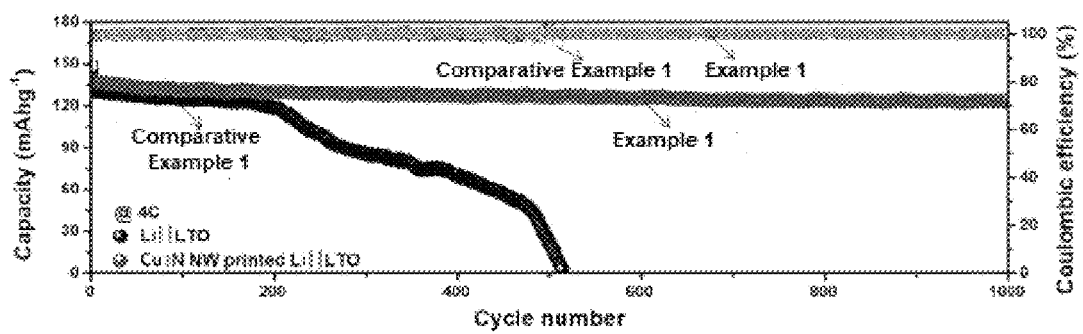

NEGATIVE ELECTRODE COMPRISING A PROTECTIVE LAYER FOR A LITHIUM SECONDARY BATTERY, METHOD FOR MANUFACTURING SAME, AND LITHIUM SECONDARY BATTERY INCLUDING SAME

TECHNICAL FIELD

The present application claims the benefits of priorities based on Korean Patent Application No. 10-2019-0026807 filed on Mar. 8, 2019 and Korean Patent Application No. 10-2020-0027055 filed on Mar. 4, 2020, the entire contents of which are incorporated herein by reference.

The present invention relates to a negative electrode for a lithium secondary battery, a manufacturing method thereof, and a lithium secondary battery comprising the same.

BACKGROUND ART

Until a recent date, there has been considerable interest in developing batteries with high energy densities using lithium as a negative electrode. For example, as compared to other electrochemical systems with a lithium inserted carbon negative electrode and a nickel or cadmium electrode that reduce the energy density of the battery by increasing the weight and volume of the negative electrode due to the presence of the non-electroactive material, since lithium metal has low and weight high capacity characteristics, lithium metal has attracted much attention as a negative electrode active material for electrochemical batteries. Lithium metal negative electrode, or negative electrodes, which mainly comprise lithium metal, provides the opportunity to construct a battery that is lighter and has a higher energy density than the battery such as a lithium-ion, nickel metal hydride or nickel-cadmium battery. These features are highly desirable for batteries for portable electronic devices, such as cell phones and lap-top computers, where premiums are paid with low weighted value.

Conventional lithium ion batteries have an energy density of 700 wh/l by using graphite as a negative electrode and using lithium cobalt oxide (LCO) as a positive electrode. However, in recent years, the fields requiring high energy density are expanding, and thus there is a continuing need to increase the energy density of a lithium ion battery. For example, even in order to increase the mileage of an electric car by a single charge to 500 km or more, an increase in energy density is required.

In order to increase the energy density of the lithium ion battery, the use of lithium electrode is increasing. However, there is a problem that lithium metal is difficult to handle in process because it is highly reactive and difficult to handle.

If lithium metal is used as a negative electrode of a lithium secondary battery, the lithium metal reacts with impurities such as electrolytes and water or organic solvents, lithium salts and the like to form a passivation layer (Solid Electrolyte Interphase: SEI). Such a passivation layer causes localized current density differences to promote the formation of dendrite by lithium metal during charging, and the dendrite grows gradually during charging/discharging, thereby causing an internal short circuit between the positive electrode and the negative electrode. Also, the dendrite has a mechanically weak part (bottle neck), and thus forms inert lithium (dead lithium) which loses electrical contact with the current collector during discharging, thereby reducing the capacity of the battery, shortening the cycle lifetime, and adversely affecting the stability of the battery.

In order to improve the problems of the lithium metal negative electrode as described above, a lithium metal negative electrode with a protective layer having various compositions or forms has been developed (Chinese Patent Publication No. 107863488, Korean Patent Publication No. 2018-0012541).

However, the results of research on the protective layer of lithium metal negative electrode which can improve overall battery performance in the lithium secondary battery are insufficient.

Therefore, in order to improve the performance of the battery in the battery using lithium metal as a negative electrode, it is urgent to develop a lithium metal negative electrode that exhibits uniform electrical conductivity on the electrode surface to suppress the growth of lithium dendrite and prevent the occurrence of dead Li.

PRIOR ART DOCUMENT

Patent Document (Patent Document 1) Chinese Patent Publication No. 107863488

(Patent Document 2) Korean Patent Publication No. 2018-0012541

DISCLOSURE

Technical Problem

As a result of various studies to solve the above problems, the present inventors manufactured a negative electrode by transferring a protective layer comprising a three-dimensional structural body containing a void therein to the surface of a lithium metal layer. It was confirmed that by forming the three-dimensional structural body to include a metal layer and a lithium nitride layer formed on the surface of the metal layer, uniform lithium ion and electrical conductivity are induced on the surface of the lithium metal layer by the lithium nitride layer.

Accordingly, it is an object of the present invention to provide a negative electrode for a lithium secondary battery showing uniform ionic conductivity and electrical conductivity on the surface of the lithium metal layer.

It is another object of the present invention to provide a method of manufacturing a negative electrode for the lithium secondary battery.

It is still another object of the present invention to provide a lithium secondary battery comprising the negative electrode.

Technical Solution

In order to achieve the above objects, the present invention provides a negative electrode for a lithium secondary battery comprising a lithium metal layer and a protective layer formed on at least one side of the lithium metal layer, wherein the protective layer comprises a three-dimensional structural body, and the three-dimensional structural body comprises metal and lithium nitride.

The metal may comprise one or more lithiophilic metals selected from the group consisting of Cu, Si, Ge, Zn, and Ti.

The protective layer may have a thickness of 1 to 30 µm.

The three-dimensional structural body may comprise 50 to 99 wt. % of metal and 1 to 50 wt. % of lithium nitride.

The lithium metal layer may have a thickness of 1 to 700 µm.

The present invention also provides a method for manufacturing a negative electrode for a lithium secondary battery comprising the steps of (S1) forming a metal hydroxide having a three-dimensional structure by immersing metal in an etching solution; (S2) forming a metal nitride having a three-dimensional structure by nitridation reaction of the metal hydroxide of the three-dimensional structure; and (S3) transferring the metal nitride having the three-dimensional structure onto a lithium metal layer to form a protective layer which comprises a three-dimensional structural body comprising metal and lithium nitride.

In step (S1), the etching solution may comprise one or more alkaline selected from the group consisting of sodium hydroxide, potassium hydroxide, calcium hydroxide, lithium hydroxide, and ammonia.

The etching solution may further comprise at least one persulfate selected from the group consisting of ammonium persulfate, sodium persulfate, and potassium persulfate.

In step (S2), the nitridation reaction may be performed by reacting a nitrogen source gas with the metal hydroxide of the three-dimensional structure under an inert atmosphere.

The nitrogen source gas may comprise at least one selected from the group consisting of ammonia ($NH_3$), nitrogen ($N_2$), and nitrous oxide ($N_2O$).

In step (S3), the metal nitride of the three-dimensional structure may be in contact with the lithium metal layer and then pressed and transferred.

The present invention also provides a lithium secondary battery comprising the negative electrode.

Advantageous Effects

According to the present invention, it is possible to manufacture a negative electrode for a lithium secondary battery including lithium nitride, which does not exist naturally and thus can be manufactured only through chemical synthesis. Specifically, it can cause lithium nitride to spontaneously form on the surface of lithium metal by forming a metal nitride of a three-dimensional structure through the nitridation reaction of the metal hydroxide, and then transferring it to the lithium metal layer. A negative electrode for a lithium secondary battery comprising the lithium metal layer and a protective layer on which the three-dimensional structural body composed of the metal and lithium nitride is formed can be manufactured. Since lithium nitride has excellent lithium ion conductivity, due to the protective layer comprising lithium nitride formed on the surface of the lithium metal layer, the surface of the lithium metal layer can exhibit uniform ionic conductivity and electrical conductivity, and the side reaction of the electrolyte solution with the lithium metal layer can be suppressed.

In addition, in the negative electrode for the lithium secondary battery according to the present invention, the lithium nitride forms a three-dimensional structural body together with the metal in the protective layer, thereby preventing the growth of lithium dendrite and allowing lithium ions to be deposited in a smooth and dense structure on the surface of the lithium metal layer. Accordingly, the life and safety of the lithium secondary battery can be improved. For example, due to the protective layer comprising a three-dimensional structural body made of the metal and lithium nitride, the resistance of the surface of the lithium metal can be lowered and side reaction is minimized even after continuous charging/discharging, thereby improving the stability of the interface.

In addition, due to the three-dimensional structural body included in the protective layer, it is possible to solve the phenomenon that a locally high current appears on the lithium metal layer.

DESCRIPTION OF DRAWINGS

FIG. 1 is a schematic view showing a longitudinal section of a negative electrode for a lithium secondary battery according to an embodiment of the present invention.

FIG. 2 is a process diagram of manufacturing the negative electrode for the lithium secondary battery of Example 1.

FIG. 3 is an X-ray photoelectron spectroscopy (XPS) graph for negative electrodes of Example 1 and Comparative Example 1, respectively.

FIG. 4 is a scanning electron microscopy (SEM) image of surfaces of negative electrodes manufactured in Example 1, Comparative Example 1, and Comparative Example 4, respectively.

FIGS. 5a and 5b are images showing lithium deposition patterns on negative electrodes when operating the lithium secondary batteries comprising negative electrodes of Example 1 and Comparative Example 1, respectively, which show SEM images of the surface and longitudinal section of the negative electrode, respectively.

FIGS. 6a, 6b, and 6c are graphs showing measurement results of lifetime characteristics for the lithium secondary batteries manufactured in Example 1, Comparative Example 1, and Comparative Example 4, respectively.

FIGS. 7a and 7b are graphs showing experimental results of performance measurement for lithium secondary batteries comprising negative electrodes manufactured in Example 1 and Comparative Example 1, respectively (FIG. 7a: a lithium secondary battery comprising a LCO electrode, FIG. 7b: a lithium secondary battery comprising a LTO electrode).

BEST MODE

Hereinafter, the present invention will be described in more detail to assist in understanding the present invention.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

As used herein, the term "three-dimensional structure" is a concept meaning a structure that includes a void therein, wherein the void broadly includes the form of an empty space, such as a pore or passage.

In the present invention, the "three-dimensional structural body" is a framework comprising a void therein, and refers to a structural body in which the frame is made of metal and lithium nitride.

Negative Electrode for Lithium Secondary Battery

One aspect of the present disclosure is a negative electrode for a lithium secondary battery comprising a lithium metal layer and a protective layer on at least one side of the lithium metal layer, wherein the protective layer comprises a three-dimensional structural body, and the three-dimensional structural body comprises metal and lithium nitride ($Li_3N$).

FIG. 1 is a schematic view showing a longitudinal section of a negative electrode for a lithium secondary battery according to an embodiment of the present invention.

Referring to FIG. 1, the negative electrode (1) for the lithium secondary battery may comprise the lithium metal layer (10) and the protective layer (20) formed on at least one side of the lithium metal layer (10). In addition, the lithium metal layer (10) may be formed on at least one side of the current collector (not shown).

In the negative electrode for the lithium secondary battery according to the present invention, the three-dimensional structural body formed on the protective layer may comprise metal and lithium nitride, and specifically, may comprise 50 wt. % to 99 wt. % of the metal and 1 wt. % to 50 wt. % of the lithium nitride.

In the present invention, the metal may serve to maintain the shape of the three-dimensional structural body while exhibiting electrical conductivity.

The metal may comprise at least one lithiophilic metal selected from the group consisting of Cu, Si, Ge, Zn, and Ti, and preferably Cu. If a lithiophilic metal is used as the metal, it can be advantageous for the formation of the three-dimensional structural body containing lithium nitride, the surface resistance of the lithium metal can be lowered, and even after continuous charging/discharging, side reactions can be minimized, thereby improving the stability of the interface.

The metal may be comprised in an amount of 50 wt. % to 99 wt. % based on the total weight of the three-dimensional structural body. Specifically, the content of the metal may be 50 wt. % or more, 70 wt. % or more, 90 wt. % or more, and 99 wt. % or less, 98 wt. % or less based on the total weight of the three-dimensional structural body. If the content of the metal is less than 50 wt. %, the durability of the three-dimensional structural body is lowered, and the electrical conductivity on the surface of the lithium metal layer may be lowered. If the content of the metal exceeds 99 wt. %, since the content of lithium nitride contained in the three-dimensional structural body is relatively reduced, lithium ion conductivity may be deteriorated.

In the present invention, the lithium nitride is suitable as a material for the protective layer for protecting the lithium metal due to its high lithium ion conductivity. If lithium nitride is used as a material for the protective layer for protecting the lithium metal, the electrical conductivity at the interface between the lithium metal and the electrolyte solution may be lowered, and the ionic conductivity may be increased.

The lithium nitride may be comprised in an amount of 1 wt. % to 50 wt. % based on the total weight of the three-dimensional structural body. Specifically, the content of lithium nitride nay be 1 wt. % or more, 2 wt. % or more, and 50 wt. % or less, 30 wt. % or less, 10 wt. % or less based on the total weight of the three-dimensional structural body. If the content of the lithium nitride is less than 1 wt. %, the lithium ion conductivity at the negative electrode may be lowered. If the content of the lithium nitride exceeds 50 wt. %, since the content of the metal contained in the three-dimensional structural body is relatively reduced, the durability and the electrical conductivity of the three-dimensional structural body may be deteriorated.

In the present invention, the protective layer may comprise the three-dimensional structural body.

The thickness of the protective layer may be 1 μm to 30 μm. Specifically, the thickness of the protective layer may be 1 μm or more, 2 μm or more, and 30 μm or less, 10 μm or less, or 5 μm or less. If the thickness of the protective layer is less than 1 μm, the performance of protecting the lithium metal layer from moisture and external air may be deteriorated. If the thickness of the protective layer exceeds 30 μm, the protective layer itself acts as resistance, and thus the performance of the battery may be deteriorated.

In the present invention, the thickness of the lithium metal layer may be 1 μm to 700 μm. Specifically, the thickness of the lithium metal layer may be 1 μm or more, 5 μm or more, 50 μm or more, 100 μm or more, and 700 μm or less, 600 μm or less, or 550 μm or less. If the thickness of the lithium metal layer is less than 1 μm, the capacity of the battery may be lowered. If the thickness of the lithium metal layer exceeds 700 μm, the effect of inhibiting the growth of lithium dendrite may be insufficient.

In the negative electrode for the lithium secondary battery according to the present invention, the current collector is not particularly limited as long as it has electrical conductivity without causing chemical changes in the battery, and the current collector may be selected from, for example, copper, stainless steel, aluminum, nickel, titanium and sintered carbon. In addition, the copper or stainless steel may be surface-treated with carbon, nickel, titanium, silver, or the like. In addition, the current collector may be aluminum-cadmium alloy or the like. In addition, the current collector may have various forms such as film, sheet, foil, net, porous body, foam, nonwoven fabric or the like with fine irregularities formed on the surface.

Method for Manufacturing Negative Electrode for Lithium Secondary Battery

Another aspect of the present disclosure is a method for manufacturing a negative electrode for a lithium secondary battery comprising the steps of a first step of (S1) forming a metal hydroxide having a three-dimensional structure by immersing metal in an etching solution; a second step of (S2) forming a metal nitride having a three-dimensional structure by nitridation reaction of the metal hydroxide of the three-dimensional structure; and a third step of (S3) transferring the metal nitride having the three-dimensional structure onto a lithium metal layer to form a protective layer wherein the protective layer comprises a three-dimensional structural body comprising metal and lithium nitride.

In step (S1) in the present invention, a metal hydroxide having a three-dimensional structure by immersing the metal in an etching solution can be formed.

The metal may comprise, but is not limited to, a lithiophilic metal selected from the group consisting of Cu, Si, Ge, Zn and Ti. For example, the metal reacts with the etching solution for the metal capable of etching the metal to form a metal hydroxide having a three-dimensional structure, forms metal nitride by a nitridation reaction, and is not limited as long as it is a metal having a property capable of forming lithium nitride by reaction of the metal nitride with lithium due to lithiophilic property. Preferably, the metal may be Cu.

In addition, the etching solution for the metal may cause metal hydroxide having a three-dimensional structure to be formed by causing a three-dimensional structure to be grown while etching the metal as well as a material containing the metal. For example, the metal may be etched by the etching solution to grow in a nanowire (NW) or nanorod (NR) form, thereby forming a metal hydroxide having a three-dimensional structure.

The metal etching solution may contain alkaline or may be a solution containing alkaline and persulfate. Preferably, the etching solution for the metal may include alkaline and persulfate. In this case, it may be advantageous in that the time for forming the metal hydroxide is shortened.

In addition, the concentration of the etching solution for the metal may be 1 M to 10 M. Specifically, the concentration of the etching solution for the metal may be 1 M or more, 1.5 M or more, 2 M or more, and 10 M or less, 8 M or less, and 5 M or less. If the concentration of the etching solution for metal is less than 1 M, it may take a long time to synthesize a metal hydrate having a three-dimensional structure. If the concentration of the etching solution for the metal is greater than 10 M, it may be difficult to synthesize a metal hydrate having a three-dimensional structure.

In addition, the etching solution for the metal may preferably be an aqueous solution using water as a solvent.

The alkaline may be at least one selected from the group consisting of sodium hydroxide, potassium hydroxide, calcium hydroxide, lithium hydroxide and ammonia, and preferably sodium hydroxide. The persulfate may be at least one selected from the consisting of ammonium persulfate (APS), sodium persulfate and potassium persulfate, and preferably ammonium persulfate.

In step (S2) in the present invention, the metal nitride having the three-dimensional structure can be formed by a nitridation reaction of the metal hydroxide having the three-dimensional structure.

The nitridation reaction may be performed by reacting a nitrogen source gas with the metal hydroxide having the three-dimensional structure under an inert atmosphere.

The inert atmosphere may be formed by at least one inert gas selected from the group consisting of nitrogen, argon, helium, neon, and xenon, and preferably, the inert gas may be nitrogen or argon.

The nitrogen source gas may be at least one selected from the group consisting of ammonia ($NH_3$), nitrogen ($N_2$), and nitrous oxide ($N_2O$), and preferably ammonia.

If the nitrogen source gas is flowed to the metal hydroxide having the three-dimensional structure, a nitridation reaction can proceed to form a metal nitride having the three-dimensional structure.

In step (S3) of the present invention, a protective layer which comprises a three-dimensional structural body comprising metal and lithium nitride can be formed by transferring the metal nitride having the three-dimensional structure onto the lithium metal layer.

In step (S3) of the present invention, the metal nitride layer having the three-dimensional structure can be transferred onto the lithium metal layer.

The transfer may be performed by bringing the metal nitride layer of the three-dimensional structure into contact with the lithium metal layer, and then applying mechanical energy by pressing.

During the transfer, a part of lithium metal included in the lithium metal layer and the metal nitride having the three-dimensional structure react to form a three-dimensional structural body comprising the metal and the lithium nitride on the lithium metal layer.

In other words, a protective layer is formed on the lithium metal layer, and the protective layer may comprise a three-dimensional structural body comprising the metal and lithium nitride.

Lithium Secondary Battery

The other aspect of the present disclosure is a lithium secondary battery comprising the negative electrode as described above.

The lithium secondary battery according to the present invention may comprise a positive electrode, a negative electrode, a separator interposed therebetween and an electrolyte.

In the lithium secondary battery according to the present invention, the negative electrode is as described above.

In the lithium secondary battery according to the present invention, the positive electrode may comprise a positive electrode current collector and a positive electrode active material layer having a positive electrode active material formed on the positive electrode current collector. In addition, the positive electrode active material layer may further comprise at least one of an electrically conductive material and a binder.

As the positive electrode active material, a lithium-containing transition metal oxide may be preferably used, and for example, may be any one selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=_1$), $LiNi_{1-y}Co_yO_2$, $LiCo_{1-y}Mn_yO_2$, $LiNi_{1-y}Mn_yO_2$ ($0 \leq y <_1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ ($0<z<2$), $LiCoPO_4$ and $LiFePO_4$, or a mixture of two or more thereof. Also, in addition to these oxides, sulfides, selenides, halides and the like can also be used.

In addition, the positive electrode active material comprises elemental sulfur ($S_8$), a sulfur-based compound, sulfur-carbon composite, or a mixture thereof. The sulfur-based compound may specifically be $Li_2S_n$ ($n \geq 1$), an organic sulfur compound or a carbon-sulfur polymer (($C_2S_x)_n$: $X=2.5$~$50$, $n \geq 2$).

In addition, the positive electrode active material may be comprised in an amount of 60 wt. % to 80 wt. % based on the total weight of the positive electrode active material layer. Specifically, the content of the positive electrode active material may be 60 wt. % or more, 65 wt. % or more, and 80 wt. % or less, 78 wt. % or less, 75 wt. % or less based on the total weight of the positive electrode active material layer. If the content of the positive electrode active material is less than 60 wt. %, the performance of the battery may be deteriorated. If the content of the positive electrode active material exceeds 80 wt. %, the content of the linear conductive material or the binder other than the positive electrode active material is relatively reduced, thereby deteriorating characteristics such as electrical conductivity or durability.

In the positive electrode for the lithium secondary battery according to the present invention, the binder may be styrene-butadiene rubber (SBR)/carboxymethyl cellulose (CMC), poly(vinyl acetate), polyvinyl alcohol, polyethylene oxide, polyvinyl pyrrolidone, alkylated polyethylene oxide, crosslinked polyethylene oxide, polyvinyl ether, poly(methyl methacrylate), polyvinylidene fluoride, copolymer (product name: Kynar) of polyhexafluoropropylene and polyvinylidene fluoride, poly(ethyl acrylate), polytetrafluoroethylene, polyvinylchloride, polyacrylonitrile, polyvinylpyridine, polystyrene, polyacrylic acid, and derivatives thereof, blends thereof, and copolymers thereof.

In addition, the content of the binder may be 1 wt. % to 20 wt. % based on the total weight of the positive electrode active material layer. Specifically, the content of the binder may be 1 wt. % or more, 3 wt. % or more, 5 wt. % or more, and 20 wt. % or less, 18 wt. % or less, 15 wt. % or less based on the total weight of the positive electrode active material layer. If the content of the binder is 1 wt. % or more, the binding force between the positive electrode active materials or between the positive electrode active materials and the current collector is greatly improved, and the problem that capacity characteristic is deteriorated can also be prevented. In addition, it can be expected to inhibit leaching of polysulfide by the interaction between polysulfide and a specific functional group in the polymer chain used as a binder. If the content of the binder exceeds 20 wt. %, The capacity of the battery may be lowered.

In the positive electrode for the lithium secondary battery according to the present invention, the electrically conductive material is for improving the electrical conductivity, and is not particularly limited as long as it is an electron conductive material that does not cause chemical changes in the lithium secondary battery.

The electrically conductive material is not particularly limited as long as it has electrical conductivity without causing chemical changes in the battery. For example, graphite such as natural graphite or artificial graphite; carbon blacks such as carbon black, acetylene black, Ketjen black, channel black, furnace black, lamp black, and thermal black; electrically conductive fibers such as carbon fiber and metal fiber; metal powders such as carbon fluoride, aluminum and nickel powder; electrically conductive whiskers such as zinc oxide and potassium titanate; electrically conductive metal oxides such as titanium oxide; polyphenylene derivative can be used.

In the positive electrode for a lithium secondary battery according to the present invention, the positive electrode current collector is not particularly limited as long as it has a high electrical conductivity without causing chemical changes in the battery. For example, stainless steel, aluminum, nickel, titanium, sintered carbon, or aluminum or stainless steel surface-treated with carbon, nickel, titanium, silver or the like can be used. At this time, the positive electrode current collector may have various forms such as film, sheet, foil, net, porous body, foam, nonwoven fabric or the like with fine irregularities formed on the surface to increase the adhesive force with the positive electrode active material.

In the lithium secondary battery according to the present invention, the separator positioned between the negative electrode and the positive electrode can be any one as long as it separates or insulates the negative electrode and the positive electrode from each other and allows ion transport between the negative electrode and the positive electrode.

The separator may be made of a porous substrate. The porous substrate may be any porous substrate commonly used in an electrochemical device. For example, a polyolefin-based porous membrane or a nonwoven fabric may be used, but not particularly limited thereto.

Examples of the polyolefin-based porous membrane may be a membrane formed of any polymer alone selected from polyethylenes such as high-density polyethylene, linear low-density polyethylene, low-density polyethylene and ultra-high molecular weight polyethylene, and polyolefin-based polymers such as polypropylene, polybutylene and polypentene or formed of a polymer mixture thereof.

In addition to the above-mentioned polyolefin-based nonwoven fabric, the nonwoven fabric may be a nonwoven fabric formed of, for example, each polymer alone of polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, polyethylenenaphthalene and the like, or formed of a polymer mixture thereof. The structure of the nonwoven fabric may be a spunbond or a meltblown nonwoven fabric composed of long fibers.

The thickness of the porous substrate is not particularly limited, but may be 1 μm to 100 μm. Specifically, the thickness of the porous substrate may be 1 μm or more, 5 μm or more, and 100 μm or less and 50 μm or less.

The size and porosity of the pores present in the porous substrate are also not particularly limited, but may be 0.001 μm to 50 μm and 10% to 95%, respectively.

The lithium secondary battery may further comprise a positive electrode electrolyte solution on the positive electrode side and a negative electrode electrolyte solution on the negative electrode side separated by a separator. The positive electrode electrolyte solution and the negative electrode electrolyte solution may comprise a solvent and an electrolytic salt, respectively. The positive electrode electrolyte solution and the negative electrode electrolyte solution may be the same or different from each other.

In the lithium secondary battery according to the present invention, the electrolyte solution may be an aqueous electrolyte solution or a non-aqueous electrolyte solution. The aqueous electrolyte solution may contain water as a solvent, and the non-aqueous electrolyte solution may contain a non-aqueous solvent as a solvent.

The electrolytic salt which is comprised in the non-aqueous electrolyte solution is lithium salt. The lithium salt can be used without limitation as long as it is commonly used in an electrolyte solution for a lithium secondary battery. For example, the lithium salt may be at least one selected from the group consisting of LiFSI, $LiPF_6$, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiPF_6$, $LiAlCl_4$, $CH_3SO_3Li$, $CF_3SO_3Li$, $(CF_3SO_2)_2NLi$, lithium chloroborane, and 4-phenyl lithium borate.

As the organic solvent contained in the non-aqueous electrolyte solution, those conventionally used in an electrolyte solution for a lithium secondary battery may be used without limitation, and for example, ether, ester, amide, linear carbonate, cyclic carbonate, etc. may be used alone or in combination of two or more. Among them, representatively, the cyclic carbonate, the linear carbonate, or the carbonate compound which is a slurry thereof may be used.

In addition, specific examples of the cyclic carbonate compound may comprise at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, and halides thereof, or a slurry of two or more thereof. Examples of such halides comprise, but are not limited to, fluoroethylene carbonate (FEC) and the like.

In addition, specific examples of the linear carbonate compound may representatively comprise, but is not limited to, at least one selected from the group consisting of dimethyl carbonate (DMC), diethyl carbonate (DEC), dipropyl carbonate, ethylmethyl carbonate (EMC), methylpropyl carbonate, and ethylpropyl carbonate, or a slurry of two or more thereof. In particular, ethylene carbonate and propylene carbonate, which are cyclic carbonates, among the carbonate-based organic solvents are high-viscosity organic solvents which have a high dielectric constant and thus can dissociate the lithium salt in the electrolyte better. If such cyclic carbonates are mixed with an appropriate proportion of a linear carbonate having a low viscosity and a low dielectric constant such as dimethyl carbonate and diethyl carbonate, an electrolyte solution having higher electrical conductivity can be prepared.

In addition, the ether among the organic solvents may be, but is not limited to, at least one selected from the group consisting of dimethyl ether, diethyl ether, dipropyl ether, methylethyl ether, methylpropyl ether, and ethylpropyl ether, or a slurry of two or more thereof.

In addition, the ester among the organic solvents may be, but is not limited to, at least one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone, and ε-caprolactone, or a slurry of two or more thereof.

The injection of the non-aqueous electrolyte solution can be performed at an appropriate stage of the manufacturing process of the electrochemical device depending on the manufacturing process and required properties of the final product. That is, it can be applied before assembling the electrochemical device or in the final stage of assembling the electrochemical device.

In the case of the lithium secondary battery according to the present invention, it is possible to perform laminating or stacking and folding processes of the separator and the electrode, in addition to the winding process which is a general process.

In addition, the shape of the battery case is not particularly limited, and may be of various shapes such as a cylindrical shape, a laminate shape, a square shape, a pouch shape, or a coin shape. The structure and manufacturing method of these batteries are well known in the art, and thus detailed description thereof is omitted.

In addition, the lithium secondary battery may be classified into various batteries, such as a lithium-sulfur battery, a lithium-air battery, a lithium-oxide battery, and a lithium all-solid battery, depending on the positive electrode/negative electrode material used.

In addition, the present invention provides a battery module including the lithium secondary battery as a unit cell.

The battery module may be used as a power source of medium or large-sized devices requiring high temperature stability, long cycle characteristics, and high capacity characteristics.

Examples of the medium or large-sized devices may comprise, but are not limited to, a power tool that is powered and moved by an electric motor; electric cars including an electric vehicle (EV), a hybrid electric vehicle (HEV), a plug-in hybrid electric vehicle (PHEV), and the like; an electric motorcycle including an electric bike (E-bike) and an electric scooter (E-scooter); an electric golf cart; and a power storage system.

Hereinafter, preferred examples are provided to help understanding of the present invention, but the following examples are only for exemplifying the present invention, and it is apparent to those skilled in the art that various changes and modifications can be made within the scope and spirit of the present invention, and such changes and modifications are within the scope of the appended claims.

Example 1: Negative Electrode for Lithium Secondary Battery

According to the process shown in FIG. 2, a negative electrode for a lithium secondary battery was prepared in the following manner.

(1) Formation of Metal Hydroxide of Three-Dimensional Structure ($Cu(OH)_2$NW Foil)

The metal was a Cu foil having a thickness of 18 μm, and as an etching solution for metal, an etching solution prepared by mixing 0.133M of aqueous ammonium persulfate solution and 2.67M of aqueous NaOH solution in a 1:1 weight ratio was used.

The Cu foil was etched by immersing it in the etching solution for 10 minutes, washed with water and ethanol, and vacuum-dried in an oven at 50° C. to prepare $Cu(OH)_2$NW foil which is Cu hydroxide having a three-dimensional structure (NW: nanowire).

(2) Formation of Metal Nitride of Three-Dimensional Structure by Nitridation of Metal Hydroxide Having Three-Dimensional Structure ($Cu_3N$ NW Foil)

Under an inert atmosphere formed by nitrogen gas, the nitridation reaction was performed by causing ammonia gas to flow to $Cu(OH)_2$NW foil, a metal hydroxide having a three-dimensional structure to manufacture $Cu_3N$ NW foil, a metal nitride having a three-dimensional structure.

(3) Transfer of Metal Nitride Having Three-Dimensional Structure onto Lithium Metal Layer ($Li_3N@Cu_3N$ NW—Li)

The process of transferring a $Cu_3N$ NW foil onto the lithium metal layer was performed by bringing the $Cu_3N$ NW foil, a metal nitride having the three-dimensional structure, into contact with a lithium metal layer having a thickness of 500 μm, and then rolling it, and thus a three-dimensional structural body comprising Cu and lithium nitride was formed on the lithium metal layer.

After the transfer process, it was confirmed that a negative electrode having a protective layer with a thickness of 3 μm comprising the three-dimensional structural body is formed on the lithium metal layer ($LiN@Cu_3N$ NW—Li).

Example 2: Lithium Secondary Battery (for Full Cell Test)

The negative electrode prepared in Example 1 (a three-dimensional structural body is transferred to lithium with a thickness of 500 μm to form a protective layer) is used, and a LCO electrode prepared by mixing LCO ($LiCoO_2$):Ketjen black:polyvinylidene fluoride (PVDF) in a ratio of 8:1:1 was used as a positive electrode. A lithium secondary battery in the form of a coin cell was manufactured using an electrolyte solution, which was prepared in a composition containing EC/DEC (3:7, v/v) as a solvent, 1.3M $LiPF_6$ and 5% by weight of FEC, and a polypropylene separator (EC: ethylene carbonate, DEC: diethyl carbonate, FEC: fluoroethylene carbonate).

Comparative Example 1: Lithium Negative Electrode without Protective Layer and Lithium Secondary Battery A lithium secondary battery was prepared in the same manner as in Example 2, using a thin film of lithium metal having a thickness of 500 μm as a negative electrode (bare Li).

Comparative Example 2: Negative Electrode Containing Metal Nitride with Three-Dimensional Structure and Lithium Secondary Battery The same process as in Example 1 was performed, except that in step (3), the transfer process was performed without pressing, after bringing the $Cu_3N$ NW foil, a metal nitride layer having a three-dimensional structure, into contact with the lithium metal layer.

As a result, it was confirmed that since the pressing process is not performed, a three-dimensional structural body comprising Cu and lithium nitride is not formed on the lithium metal layer.

Comparative Example 3: Negative Electrode Having Protective Layer in the Form of Thin Film and Lithium Secondary Battery A 500 μm lithium metal layer (Honjo, lithium 1415) was prepared.

A slurry for forming a protective layer was prepared by mixing 70 wt. % of $Cu_3N$ nano powders and 30 wt. % of styrene butadiene rubber (SBR) binder.

The slurry for forming the protective layer was coated on the lithium metal layer to a thickness of 4 μm and dried to prepare a negative electrode for a lithium secondary battery, which was formed by sequentially stacking a lithium metal layer and a protective layer in the form of a layer containing $Cu_3N$.

A lithium secondary battery was manufactured in the same manner as in Example 2 using the negative electrode for the lithium secondary battery.

Comparative Example 4: Negative Electrode with Protective Layer in the Form of a Thin Film and Lithium Secondary Battery $Cu_3N$ NW foam instead of the $Cu_3N$ NW foil was prepared by performing the same method as Example 1 (1) and (2), except that Cu foam instead of Cu foil is used as a metal.

Thereafter, a negative electrode in which Li was immersed into the inner space of the $Cu_3N$ NW foam was manufactured by reacting the $Cu_3N$ NW foam with liquid lithium (molten Li) at 200° C. (Li infiltrated $Cu_3N$ NW).

A lithium secondary battery was prepared in the same manner as in Example 2 using the negative electrode.

Experimental Example 1: Photoelectron Analysis Experiment

In Example 1, after transferring a metal nitride ($Cu_3N$ NW foil) having a three-dimensional structure to a lithium metal layer, using an experiment a photoelectron spectroscopy (X-ray photoelectron spectroscopy, XPS) was performed on the manufactured negative electrode in order to confirm whether lithium nitride was formed.

FIG. 3 is an X-ray photoelectron spectroscopy (XPS) graph for negative electrodes of Example 1 ($Li_3N@Cu_3N$ NW—Li) and Comparative Example 1 (bare Li), respectively.

Referring to FIG. 3, it can be seen that in the negative electrode of Example 1, $Cu_3N$ is reduced to Cu by spontaneous reaction, and $Li_3N$ is produced, after the metal nitride ($Cu_3N$ NW foil) having a three-dimensional structure was transferred to the lithium metal layer.

Experimental Example 2: Scanning Electron Microscopy (SEM) Analysis

FIG. 4 is a scanning electron microscopy (SEM) image of surfaces of negative electrodes manufactured in Example 1, Comparative Example 1, and Comparative Example 4, respectively.

Referring to FIG. 4, it can be seen that the negative electrode of Comparative Example 1 is the surface of Bare Li, and the negative electrode of Example 1 has a protective layer in the form of a three-dimensional structural body in which voids are formed.

Also, in the negative electrode of Comparative Example 4, a form in which lithium was immersed in the foam was observed.

Experimental Example 3: Observation of Shape of Negative Electrode while Operating Lithium Secondary Battery Symmetric cells were prepared using negative electrodes prepared in Example 1 (a lithium negative electrode having a protective layer comprising a three-dimensional structural body) and Comparative Example 1 (bare Li), respectively. In order to observe the lithium deposition pattern on the negative electrode while driving the symmetric cells, the symmetric cell was driven under 3 to 20 mAh/cm² to observe the shape of the surface and longitudinal section of the negative electrode.

FIGS. 5a and 5b are images showing lithium deposition patterns on negative electrodes when operating the lithium secondary batteries comprising negative electrodes of Example 1 and Comparative Example 1, respectively, which show SEM images of the surface and longitudinal section of the negative electrode, respectively.

Referring to FIGS. 5a and 5b, it can be seen that in Example 1, lithium dendrite was not formed.

Experimental Example 4: Measurement of Lifetime Characteristics of Lithium Secondary Battery (1)

For lithium secondary batteries manufactured in the same manner as in Example 2, using negative electrodes prepared in Example 1, Comparative Example 1, and Comparative Example 4, respectively, the lithium secondary batteries were operated under a charging condition of 1 mAh/cm² and a discharging condition of 1 mAh/cm².

FIGS. 6a, 6b, and 6c are graphs showing measurement results of lifetime characteristics for the lithium secondary batteries manufactured in Example 1, Comparative Example 1, and Comparative Example 4, respectively.

Referring to the graphs, it was confirmed that Example 1 operates stably for 600 hours or more (FIG. 6a), while Comparative Example 1 is difficult to operate even for up to 100 hours (FIG. 6b), and Comparative Example 4 is difficult to operate for up to 500 hours (FIG. 6c).

Experimental Example 5: Measurement of Lifetime Characteristics of Lithium Secondary Battery (2)

Performance tests were performed on the lithium secondary batteries comprising the negative electrodes manufactured in Example 1 and Comparative Example 1, respectively. At this time, lithium secondary batteries were designed in the same manner as in Example 2, using LCO ($LiCoO_2$) and LTO ($Li_4Ti_5O_{12}$) as the positive electrode active materials, respectively.

The lithium secondary batteries were charged/discharged under a charging condition of 1 mAh/cm² and a discharging condition of 1 mAh/cm².

FIGS. 7a and 7b are graphs showing experimental results of performance measurement for lithium secondary batteries comprising negative electrodes manufactured in Example 1 and Comparative Example 1, respectively (FIG. 7a: a lithium secondary battery comprising a LCO electrode, FIG. 7b: a lithium secondary battery comprising a LTO electrode).

In the case of the LCO electrode, the electrode was manufactured at a level of a commercial electrode having a capacity per unit area of 3.4 mAh·cm⁻², and lifetime was evaluated at 0.5 C rate (~1.7 mA·cm⁻²) for all cells. In the case of the LTO electrode, the electrode was manufactured at a capacity per unit area of about 0.5 mAh·cm⁻², and lifetime was evaluated at 4 C rate (~2 mA·cm⁻²).

Referring to FIGS. 7a and 7b, it can be seen that in both the case of using LCO as the positive electrode active material and the case of using LTO, Example 1 has significantly better performance than Comparative Example 1.

In the above, although the present invention has been described by limited examples and drawings, the present invention is not limited by this, and it is apparent to those skilled in the art to which the present invention pertains that various modifications and variations are possible within the technical scope of the present invention and the equivalents of the claims to be described below.

DESCRIPTION OF SYMBOL

1: negative electrode
10: lithium metal layer
20: protective layer (three-dimensional structural body)

The invention claimed is:

1. A negative electrode for a lithium secondary battery comprising:
   a lithium metal layer; and
   a protective layer on at least one side of the lithium metal layer,
   wherein the protective layer comprises a three-dimensional structural body, and
   wherein the three-dimensional structural body comprises a frame made of metal and lithium nitride.

2. The negative electrode for the lithium secondary battery according to claim 1, wherein the metal comprises at least one lithiophilic metal selected from the group consisting of Cu, Si, Ge, Zn, and Ti.

3. The negative electrode for the lithium secondary battery according to claim 1, wherein the protective layer has a thickness of 1 μm to 30 μm.

4. The negative electrode for the lithium secondary battery according to claim 1, wherein the three-dimensional structural body comprises 50 wt. % to 99 wt. % of the metal and 1 wt. % to 50 wt. % of the lithium nitride.

5. The negative electrode for the lithium secondary battery according to claim 1, wherein the lithium metal layer has a thickness of 1 μm to 700 μm.

6. A method for manufacturing a negative electrode for a lithium secondary battery comprising the steps of:
   a first step of forming a metal hydroxide having a three-dimensional structure by immersing a metal in an etching solution;
   a second step of forming a metal nitride having a three-dimensional structure by a nitridation reaction of the metal hydroxide of the three-dimensional structure; and
   a third step of transferring the metal nitride having the three-dimensional structure onto a lithium metal layer to form a protective layer, wherein the protective layer comprises a three-dimensional structural body comprising a frame made of metal and lithium nitride.

7. The method for manufacturing the negative electrode for the lithium secondary battery according to claim 6, wherein in the first step, the etching solution comprises at least one alkaline selected from the group consisting of sodium hydroxide, potassium hydroxide, calcium hydroxide, lithium hydroxide, and ammonia.

8. The method for manufacturing the negative electrode for the lithium secondary battery according to claim 7, wherein the etching solution in the first step further comprises at least one persulfate selected from the group consisting of ammonium persulfate, sodium persulfate, and potassium persulfate.

9. The method for manufacturing the negative electrode for the lithium secondary battery according to claim 6, wherein in the second step, the nitridation reaction is performed by reacting a nitrogen source gas with a metal hydroxide having a three-dimensional structure under an inert atmosphere.

10. The method for manufacturing the negative electrode for the lithium secondary battery according to claim 9, wherein the nitrogen source gas comprises at least one selected from the group consisting of ammonia ($NH_3$), nitrogen ($N_2$), and nitrous oxide ($N_2O$).

11. The method for manufacturing the negative electrode for the lithium secondary battery according to claim 6, wherein in the third step, the metal nitride having the three-dimensional structure is in contact with the lithium metal layer and then the three-dimensional structure on the lithium metal layer is pressed and transferred to form the protective layer.

12. A lithium secondary battery comprising the negative electrode of claim 1.

* * * * *